United States Patent [19]

Carpenter

[11] 4,070,909

[45] Jan. 31, 1978

[54] SPEED COMPENSATING PITOT TUBE APPARATUS

[75] Inventor: William R. Carpenter, Muskegon, Mich.

[73] Assignee: Medallion Instruments, Inc., Spring Lake, Mich.

[21] Appl. No.: 735,744

[22] Filed: Oct. 26, 1976

[51] Int. Cl.² .............................................. G01C 21/10
[52] U.S. Cl. .................................................. 73/182
[58] Field of Search .......................... 73/182, 183, 212

[56] References Cited

U.S. PATENT DOCUMENTS

| 3,217,535 | 11/1965 | Taylor et al. | 73/182 |
| 3,975,959 | 8/1976 | Larkin | 73/419 |

FOREIGN PATENT DOCUMENTS

| 639,035 | 3/1962 | Canada | 73/182 |

*Primary Examiner*—Charles A. Ruehl

*Attorney, Agent, or Firm*—Price, Heneveld, Huizenga & Cooper

[57] ABSTRACT

A Pitot tube apparatus for actuating a marine speedometer includes a body member pivotally secured to a housing. An impact pressure-transmitting tube extends through the body member and is connected to the housing. The housing defines a pressure and surge chamber. Positioned within the chamber is a piston having a face which engages the body member. The pressure chamber is also connected to the marine speedometer. As the Pitot tube apparatus is pulled through the water, the force exerted on the body member by the water tends to rotate the body member but is compensated by the opposing force exerted by the piston on the body member. As a result, the body member is maintained at substantially the same position regardless of boat speed yet still may be pivoted upwardly if it encounters an obstacle.

15 Claims, 9 Drawing Figures

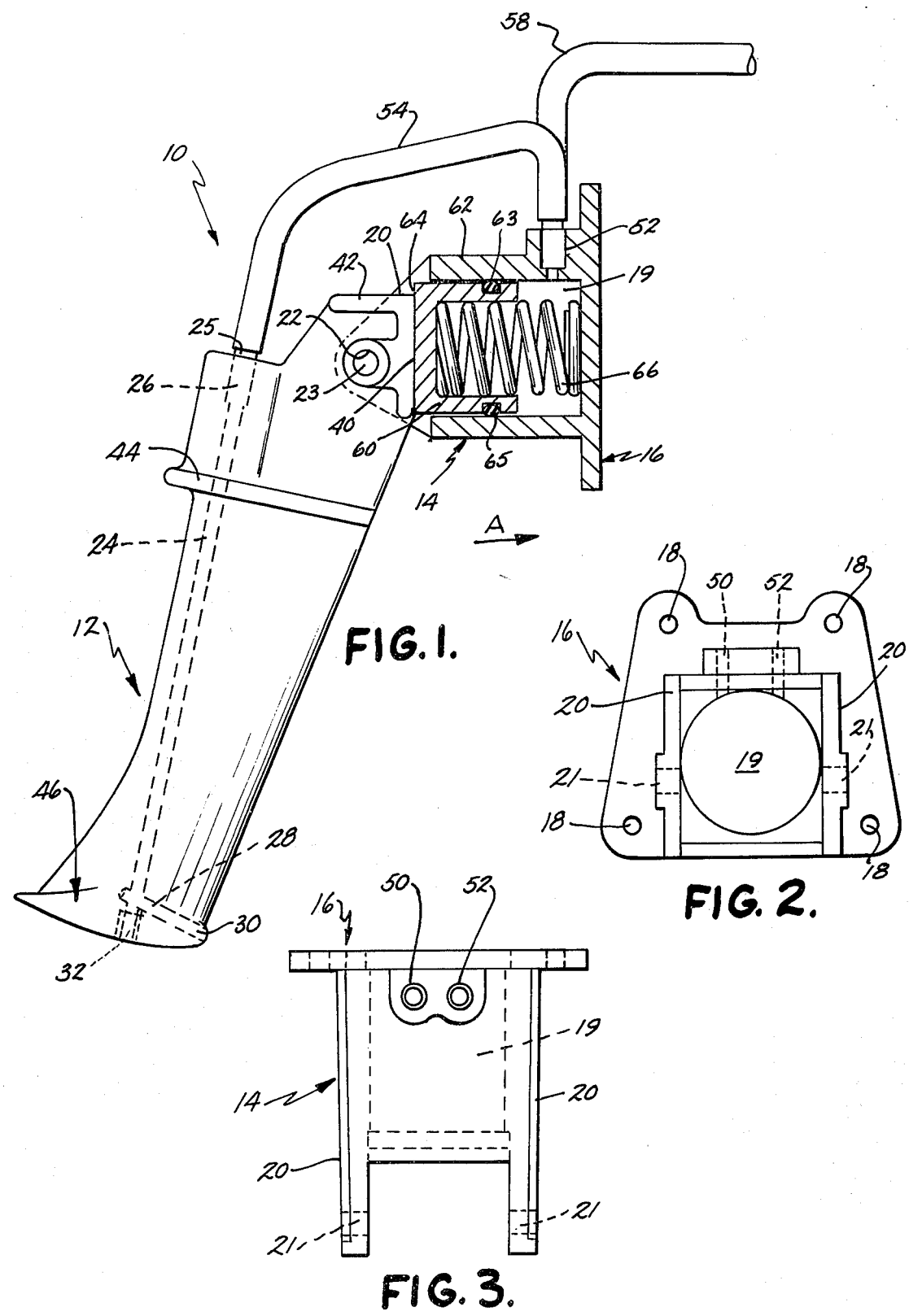

SPEED COMPENSATING PITOT TUBE APPARATUS

BACKGROUND OF THE INVENTION

This invention relates to Pitot tube type devices, and especially those for actuating marine speedometers.

Heretofore, various forms of Pitot tube devices have been proposed for actuating marine speedometers. These devices generally include a streamlined body member secured to the transom of the boat. An impact pressure-transmitting tube extends through the body member from a sensing orifice and is connected to the speedometer. The impact pressure tube transmits to the speedometer, or to a transducer which drives the speedometer, the impact pressure or velocity head which results from the relative movement of the boat with respect to the water.

This basic type of Pitot tube apparatus, in one or another form is used with practically all pleasure craft, and in general operates satisfactorily. However, if during the operation of such craft, the orifice of the impact tube should become clogged with marine weed growth or floating debris, simple forms of this type of device fail to function. In an attempt to alleviate some of the problems which result from use of the water craft in areas containing weed growth or floating debris, the hollow blade or body member has been positioned so as to be pulled through the water at an extreme rake angle of approximately 45°. Further, the orifice or stagnation point opening of the impact tube has been shrouded behind the leading edge of the blade for additional protection. Also, many prior designs incorporate some form of spring-loaded mounting bracket that allows the blade section to be pivoted into a substantially horizontal position which also facilitates beaching or trailer loading of the water craft. This spring-loaded mounting bracket also allows the blade to move up and over small submerged objects at low speeds. An example of one such Pitot tube apparatus may be found in commonly owned U.S. Pat. No. 3,181,356 to Carpenter, entitled Pitot Tube and issued on May 4, 1965.

Pitot tube constructions of the type just noted, although generally providing adequate performance at relatively low speeds, have suffered certain deficiencies as boat speeds have increased due to the availability of larger engines and jet-drive devices. These deficiencies have generally been related to the use of the shrouded impact orifice as well as the spring-loaded mounting bracket construction.

For example, in order to hold the blade in the proper position in the water at a 50 knot speed, the mounting bracket spring must be of such strength so as to provide almost no protection as a yieldable pivot device at cruising speeds. In effect, the high spring rate required results in a substantially rigid or fixed mounting of the Pitot tube blade for low speeds. Contact with underwater objects may thus result in severe damage to the blade. Also, prior Pitot tube designs which transmit the impact pressure or velocity head directly to the marine speedometer have resulted in fluctuation of the speedometer reading, particularly at high speeds and on rough water. Any transient pressure conditions due to momentary changes in the rake angle of the blade have been transmitted directly to the speedometer, resulting in surging or fluctuation of the speedometer readout.

One known attempt to maintain the Pitot tube in substantially the same position regardless of boat speed may be found in U.S. Pat. No. 3,084,543 to Finkl, entitled Pitot tube and issued on Apr. 9, 1963. The device disclosed therein includes a blade or body member pivotally connected to the transom of a boat. A paravane positioned adjacent the bottom edge of the body member is employed to counteract the force of the water which tends to rotate the Pitot tube out of position. Although compensating for increases in boat speed, this device is still prone to blockage of the impact orifice by marine growth and/or debris.

Therefore, a need exists for a Pitot tube type apparatus adapted for an improved marine speedometer wherein the position of the Pitot tube body or blade is maintained substantially constant regardless of boat speed and yet may be pivoted towards a horizontal position upon impact with underwater objects which readily sheds marine growth and/or debris capable of blocking the impact tube orifice, and, which may be pivoted to a horizontal position for beaching or transport of the boat on a trailer.

SUMMARY OF THE INVENTION

In accordance with the present invention, a unique Pitot tube type device is provided whereby the problems heretofore experienced are substantially alleviated. Essentially, the device includes depending blade or like member adapted to be pivotally secured to the craft and an impact tube having one end submerged and opening in the direction of craft travel so as to measure impact pressure. A housing defines a pressure chamber which is connected to the impact tube so that the pressure within the chamber varies as a function of craft speed. Provision is made for exerting a force on the depending member which is proportional to the pressure within the pressure chamber and therefore is proportional to the craft speed whereby forces acting on the member as a result of craft speed are compensated.

BRIEF DESCRIPTION OF THE DRAWINGS

FIG. 1 is a side, elevational view in partial section of an exemplary form of the unique speed compensated Pitot tube apparatus in accordance with the present invention;

FIG. 2 is a rear, elevational view of an exemplary form of the unique housing and mounting bracket incorporated in the present invention;

FIG. 3 is a plan view of the housing of FIG. 2;

DETAILED DESCRIPTION OF THE PREFERRED EMBODIMENT

Figure 4:
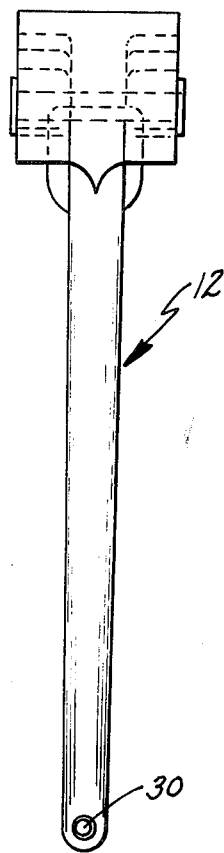
FIG. 4 is a front, elevational view of a somewhat modified form of blade member showing the positioning of the impact orifice.
Figure 5:
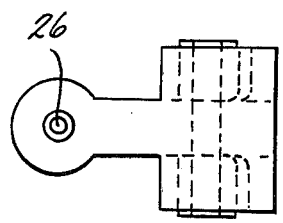
FIG. 5 is a top, plan view of the blade of FIG. 4.
Figure 6:
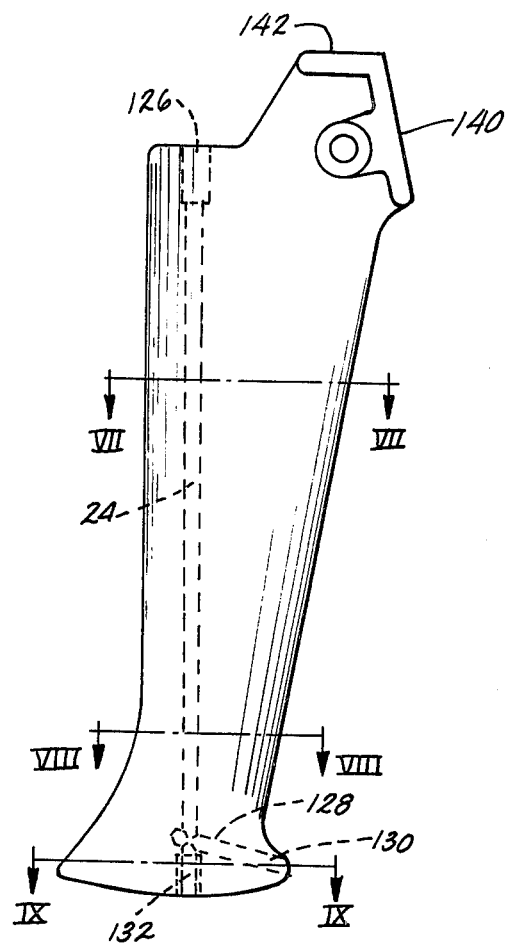
FIG. 6 is a side, elevational view of a blade similar to that shown in FIG. 4.

A preferred embodiment of the unique speed compensated Pitot tube apparatus in accordance with the present invention is illustrated in FIG. 1 and generally designated 10. As shown therein, the apparatus includes a blade or body member 12 pivotally secured to a housing 14. The housing 14 as best seen in FIGS. 1, 2 and 3 includes a mounting flange 16 having apertures 18 formed therein and further defines a pressure and surge chamber 19. The housing serves as a mounting bracket whereby the apparatus may be attached to the transom of a water craft. The housing 14 is mounted to the transom so that the blade or body member 12 is at least partially submerged in the water. Extending outwardly from the housing 14 are a pair of opposed mounting ears 20. Each mounting ear 20 includes a through bore 21. As best seen in FIG. 1, the upper end of the body member 12 is formed with a through passage 22. A pivot pin 23 extends through the two bores 22 of mounting ears 20 and bore 23 of the body member 12 and thereby pivotally secures the body member to the housing 14.

As seen in FIGS. 1 and 4-9, the blade 12 is formed with a through passage or conduit 24. Conduit 24 extends the vertical length of the blade and terminates in a counter bored opening 26 at the top edge of the blade. An impact passage 28 extends through the lower end of the blade 12 from the leading edge of the blade to the conduit 24. Passage 28, therefore, opens at the leading edge of the blade in an impact orifice or stagnation opening 30. If the blade or body member 12 is cast as a solid piece, the impact tube passages 24 and 28 are easily formed by a drilling operation. Passage 24 would typically be drilled completely through the length of the body and passage 28 would be drilled until it intersects passage 24. The lower end of passage 28 would then be closed by a suitable plug 32.

Adjacent the upper end of the body member 12 and extending upwardly along the leading edge of the body member is a flat cam surface 40. The flat surface 40 is angled at an acute angle relative to the leading edge of the blade 12. This angle of inclination, as best seen in FIG. 1, is equal to the desired rake angle of the Pitot tube blade. Also, the blade is formed with a storage cam surface 42 which intersects surface 40 and extends rearwardly in a plane perpendicular or otherwise angularly to the plane of surface 40.

The surface 42 of the blade illustrated in FIG. 1 intersects the flat face 40 at a right angle. The surface 142 of the blade illustrated in FIG. 6, by way of contrast, intersects surface 140 there, at an acute angle greater than 90°. As is clear from a comparison of FIGS. 1 and 6, varying at the angle of inclination of cam surface 40 (or 140) will vary the angle of inclination of the blade.

As seen in FIG. 1, the blade or body member 12 may be provided with a flow stabilization flange 44 which extends around the periphery of the blade near its top. Further, the lower end of the blade 12 may be formed with a bulbous portion 46 which serves to stabilize the blade in the water and also to reduce drag on the blade as it passes through the water.

As best seen in FIGS. 1 and 3, the housing 14 is provided at its top end with two taps or bores 50 and 52. Tap 52 is connected to the upper end or opening 26 of the impact tube, as by a suitable length of flexible tubing 54. As a result, the impact pressure or velocity head sensed at the orifice 30 of the tube is transmitted to the pressure and surge chamber 19 defined by the housing 14. Tap 50 is the pressure output tap, which is connected to the marine speedometer, as by a suitable length of flexible tubing 58.

Disposed within the pressure and surge chamber 19 is a pressure-responsive means which exerts a force on the blade to compensate for speed variation. As seen in FIG. 1, this pressure-responsive means preferably includes a piston 60 in the shape of an open-ended cup having a cylindrical side wall 62 and a cam-engaging end or face 64. The face 64 of the piston engages the flat cam face 40 of the blade. An O-ring 63 is disposed within a peripheral groove 65 formed in the side wall 62 to seal the pressurized water within the chamber 19. Also, within the pressure chamber 19 is a resilient biasing means preferably in the form of a coiled spring 66. The coiled spring 66 abuts against the inner face of the piston and biases the piston outwardly into engagement with the piston engaging cam face 40 of the blade.

Figure 7:
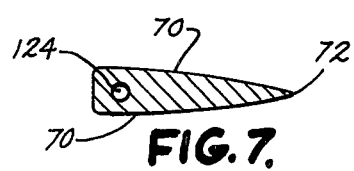
FIG. 7 is a cross-sectional view taken generally along the plane VII—VII of FIG. 6.
Figure 8:
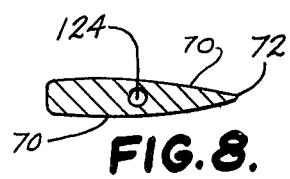
FIG. 8 is a cross-sectional view taken generally along the plane VIII—VIII of FIG. 6.
Figure 9:
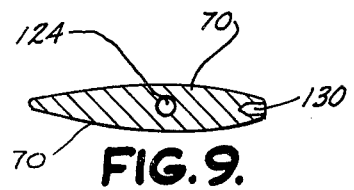
FIG. 9 is a cross-sectional view taken generally along plane IX—IX of FIG. 6.

The blade is preferably cast in a streamlined configuration, for example, having a generally triangular shape in cross section adjacent its upper portion, as seen in FIG. 7. The sides 70 of the blade curve toward the sharp leading edge 72. Adjacent the lower end of the blade, the blade cross section begins to taper in a rearward direction so as to assume a shape generally like an airfoil. This is best seen in FIGS. 8 and 9. This general cross-sectional shape for the blade helps to reduce the drag or frictional forces imposed on the blade as it is pulled through the water. These water drag forces acting on the blade tend to rotate the blade in a clockwise direction as viewed in FIG. 1.

If the blade is permitted to rotate from its standard position, the impact pressure or velocity head sensed by the impact tube will vary resulting in erroneous speedometer readings. It is desirable, however, to pivotally mount the blade so that it may kickup or rotate in a clockwise direction when it encounters submerged objects or other obstacles, at cruising speeds or less. Also, the blade should be rotatable to a horizontal position for beaching of the water craft or for transportation of the craft on a trailer. The spring-biased piston 60 which abuts the flat face 40 of the blade will maintain a substantially constant force on the blade as the apparatus is pulled through the water. The spring constant for the spring 66 is selected so that the force exerted on the blade by the spring will counteract the drag forces at low speeds yet permit the blade to easily kick-up or rotate when it encounters a submerged object. This preselected spring constant, however, would not be strong enough to maintain the blade in a substantially constant position at higher boat speeds. The additional force required to be exerted on the blade for this purpose is therefore produced by the water pressure in the chamber 19.

Since the impact tube communicates with the chamber 19, the pressure within the chamber will increase proportionally to the increase in the boat speed. As a result, as the boat increases in speed, the total force exerted on the blade tending to counteract the water drag forces will also increase. If the blade in fact begins to rotate even slightly in the clockwise direction under the action of the water drag forces, the flat face 40 will shift downwardly slightly on the rear face 64 of the piston. This results in an increase in the moment arm through which the force exerted on the blade by the piston acts. This increase in moment arm compensates for any decrease in pressure within the chamber caused by the shifting in the position of the blade and the resultant change in pressure at impact orifice 30 caused by its change in angle relative to the water. As the water drag forces exerted on a blade increase with an increase in boat speed, the pressure within the chamber 56 also increases a proportional amount so as to compensate for this increase in speed. The blade is therefore maintained in a substantially constant position.

Further, the Pitot tube device in accordance with the present invention more easily frees itself from marine growth or other debris than the designs heretofore available. As marine growth or other debris contacts the leading edge of the blade and wraps around the blade or lodges in front of the orifice 30, the pressure within the chamber 19 will be substantially decreased. As a result, the water forces acting on the blade will cause the blade to rotate in a clockwise direction, permitting the marine growth or other debris to slip off the edge of the blade and thereby unclog or free the orifice 30. As soon as this happens, the impact pressure acting on orifice 30 assumes a higher value which, with spring 66, will begin to rotate the blade in a counterclockwise direction (as viewed in FIG. 1), resulting in further increases in the impact pressure sensed by the orifice 30 and transmitted to the chamber 19. The chamber pressure will thus rapidly "pump up," extending the piston 60 until the blade is returned to its operational position.

The chamber 19 also acts as a surge chamber and damps transient pressure variations, thereby preventing these pressure variations from being transmitted to the boat speedometer through the tube 58. This damping action reduces fluctuation in the readout of the speedometer caused by transient pressure conditions sensed by the impact tube.

When it is desired to rotate the Pitot tube blade to a horizontal position for beaching of the craft or for transport on a trailer, the blade may be readily rotated manually until face 42 abuts the piston face 64. In this position, the spring 66 forcing the piston against the face 42 in effect locks the blade in the storage position. When the blade is pushed downwardly or rotated in a counterclockwise direction, a snubbing or over-center action occurs as the line defined by the intersection of faces 42 and 40 traverses the face of the piston. As this intersection traverses the face of the piston, an over-center action will suddenly occur and the blade will be snapped downwardly into its operational position.

As previously stated, the blade 12 may be cast from any suitable, preferably lightweight material, such as aluminum. In the alternative, a structural plastic may be employed to fabricate this member. Similarly, the housing 14 may be cast from aluminum or from a plastic material.

As should now be readily apparent, the unique speed compensated Pitot tube in accordance with the present invention maintains the blade in a substantially constant position regardless of boat speed yet permits the blade to be rotated or kicked up when it encounters submerged objects. The chance of damage to the blade is therefore substantially reduced. The blade will rotate and shed debris should the pressure orifice be partially or wholly blocked. This increases the versatility of the Pitot tube device permitting substantially trouble-free operation in areas having marine growth or other waterborne debris. The structural arrangement described above results in more accurate high speed readings, increased protection from collision with submerged objects at slow cruising speeds than has heretofore been obtainable with a Pitot tube capable of remaining in a substantially constant position at high speeds. The device is relatively easy to manufacture and employs the impact pressure sensed by the Pitot tube as a source of energy to control the positioning of a member submerged and pulled through the water. Indeed, in the broader aspects of the invention, the use of impact pressure and/or of a plenum or chamber therefore as generally set forth herein may be used in numerous other applications to control, position or move a wide variety of particular elements or devices on or part of the moving craft, all of which should be considered as applications of the underlying concept herein.

Various modifications may be made to the device without departing from the inventive concepts disclosed herein. For example, the shape of the blade may be varied from that illustrated and the blade may be formed as either a solid or a hollow member, since a separate tube may be used as the impact conduit. Therefore, it is expressly intended that the above description should be considered as that of the preferred embodiment only. The true spirit and scope of the present invention will be determined by reference to the appended claims.

The embodiment of the invention in which an exclusive property or privilege is claimed are defined as follows:

1. A device usable with a water craft for exerting a variable force on a movable member, said member being mounted on said craft and being subjected to fluid drag forces exerted thereon during operation of said craft and which are proportional to craft speed, said forces tending to move said member, said device comprising:
   an impact pressure tube having one end submerged and opening in the direction of craft travel;
   a housing defining a pressure chamber, said impact pressure tube being connected to said pressure chamber, whereby the pressure within said chamber varies as a function of craft speed; and
   force exerting means responsive to the pressure within said chamber for exerting a force on said member proportional to the pressure within said chamber to thereby oppose the fluid drag forces exerted on said member.

2. A device as defined by claim 1 wherein said force exerting means comprises a piston slidably mounted within said pressure chamber.

3. A device as defined by claim 2 wherein said piston directly engages said member and wherein said member is an elongated element pivotally connected to said water craft.

4. A device usable with a water craft for exerting a variable force on a member, comprising:
   an impact pressure tube having one end submerged and opening in the direction of craft travel;
   a housing defining a pressure chamber, said impact pressure tube being connected to said pressure chamber, whereby the pressure within said chamber varies as a function of craft speed;
   means responsive to the pressure within said chamber for exerting a force on said member proportional to the pressure within said chamber, said force exerting means comprising a piston slidably mounted within said pressure chamber, said piston directly engaging said member, said member being an elongated element pivotally connected to said water craft, and said impact pressure tube being carried by said member.

5. In a Pitot tube adapted for actuating a marine speedometer, of the type including an elongated, streamlined blade having a conduit extending longitudinally thereof which opens at one end through a submerged impact pressure orifice, said blade being pivotally mounted at its opposite end to a boat so as to be at least partially submerged and to be pivotable rearwardly relative to the boat by the water drag force acting on the blade as the boat moves, the improvement comprising:

means operatively engaging said blade and operatively connected to said conduit and impact pressure orifice for exerting a force on said blade proportional to boat speed and in a direction which counteracts the water drag force exerted on said blade by the water as the boat moves forwardly, said force-exerting means decreasing said force exerted on said blade if said orifice is partially or wholly blocked by debris whereby said force exerted on said blade by the water may pivot the blade rearwardly towards a horizontal position to facilitate removal of the debris thereby unblocking said orifice.

6. In a Pitot tube adapted for actuating a marine speedometer, of the type including an elongated, streamlined blade having a conduit extending longitudinally thereof which opens at one end through an impact pressure orifice, said blade being pivotally mounted at its opposite end to a boat so as to be at least partially submerged and to be pivotable rearwardly relative to the boat, by the force of the water as the boat moves, the improvement comprising:

means operatively engaging said blade for exerting a force on said blade proportional to boat speed and in a direction which counteracts the force exerted on said blade by the water as the boat moves forwardly, said force-exerting means decreasing said force if said orifice is partially or wholly blocked by debris whereby said blade will pivot rearwardly under the force exerted by the water towards a horizontal position to facilitate removal of the debris thereby unblocking said orifice, said force-exerting means comprising:

a housing defining a pressure chamber, said conduit being connected to said pressure chamber; and a piston slidably received within said pressure chamber and operatively engaging said blade adjacent the pivoted end thereof.

7. The improvement as defined by claim 6 further including resilient biasing means positioned within said chamber for biasing said piston toward a position maintaining said blade in a substantially constant position at relatively low boat speeds.

8. The improvement as defined by claim 7 wherein said housing further defines an outlet, said outlet adapted for connection to said speedometer whereby pressure surges are dampened within said chamber thereby steadying operation of said speedometer.

9. The improvement as defined by claim 7 wherein said blade includes a substantially flat surface positioned at an angle relative to the longitudinal center line of said blade and engaging the face of said piston, said angle corresponding to a predetermined angle of inclination of said blade in the water whereby as said blade is rotated under the force exerted on said blade by the moving water, the moment arm through which said piston exerts its counteracting force increases thereby increasing the equalizing torque so that said blade is rotated back to its predetermined angle of inclination.

10. A Pitot tube type device adapted for actuating a marine speedometer, comprising:

a blade having a leading edge and a conduit extending longitudinally thereof, said conduit opening through said leading edge;

a housing adapted to be secured to a boat, said blade being carried by said housing, for movement relative thereto longitudinally of the boat, said housing defining a pressure chamber; and a piston slidably received within said housing pressure chamber and operatively engaging said blade, said conduit being connected to said pressure chamber whereby the pressure within said chamber varies as a function of the boat speed and said piston thereby exerts a force on said blade tending to counteract movement of the blade due to water drag forces acting on said blade so that said blade remains in a substantially constant position regardless of boat speed.

11. A Pitot tube type device as defined by claim 10 further including resilient biasing means disposed within said pressure chamber for biasing said piston against said blade.

12. A Pitot tube type device as defined by claim 11 wherein said resilient biasing means is a coil spring.

13. A pilot tube type device as defined by claim 10 wherein said conduit communicates with said speedometer through said pressure chamber whereby transient pressure variations are damped within said pressure chamber thereby steadying speedometer operation.

14. A pilot tube type device as defined by claim 10 wherein said blade includes a generally flat cam face engaged by said piston, said cam face being positioned at an angle relative to the longitudinal center line of the blade.

15. A pitot tube type device as defined by claim 14 wherein said blade further includes a storage cam face along the upper edge of said blade and positioned at an angle to said piston-engaging cam face, said blade being mounted for rotation to a desired storage position in which said storage face is aligned with said piston face, and in which said piston exerts a force on said blade storage face tending to hold said blade in said storage position.

* * * * *